US008793562B2

(12) United States Patent
Kim et al.

(10) Patent No.: US 8,793,562 B2
(45) Date of Patent: Jul. 29, 2014

(54) APPARATUS AND METHOD FOR DECODING IN MOBILE COMMUNICATION SYSTEM

(75) Inventors: Se-Hyoung Kim, Seoul (KR); Han-Ju Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1078 days.

(21) Appl. No.: 12/248,500

(22) Filed: Oct. 9, 2008

(65) Prior Publication Data

US 2009/0106635 A1    Apr. 23, 2009

(30) Foreign Application Priority Data

Oct. 17, 2007  (KR) .................. 10-2007-0104426

(51) Int. Cl.
*G08C 25/00* (2006.01)
*H04L 1/00* (2006.01)
*H04L 1/20* (2006.01)
*H04L 1/18* (2006.01)

(52) U.S. Cl.
CPC ............ *H04L 1/1845* (2013.01); *H04L 1/0053* (2013.01); *H04L 1/20* (2013.01); *H04L 1/201* (2013.01)
USPC ........... 714/799; 714/751; 714/758; 375/262; 375/377

(58) Field of Classification Search
USPC .................. 375/377, 262; 714/758, 751, 799
See application file for complete search history.

(56) References Cited

U.S. PATENT DOCUMENTS

| | | | |
|---|---|---|---|
| 6,654,926 B1* | 11/2003 | Raphaeli et al. | 714/780 |
| 6,671,849 B2 | 12/2003 | Tripathi et al. | |
| 2002/0015419 A1* | 2/2002 | Kim et al. | 370/468 |
| 2002/0061080 A1* | 5/2002 | Richards et al. | 375/346 |
| 2002/0089451 A1* | 7/2002 | Wang et al. | 342/458 |
| 2003/0145269 A1* | 7/2003 | Kuo et al. | 714/749 |
| 2003/0188252 A1* | 10/2003 | Kim et al. | 714/779 |
| 2003/0217319 A1* | 11/2003 | Tripathi et al. | 714/751 |
| 2004/0243904 A1* | 12/2004 | Kim et al. | 714/755 |
| 2006/0067394 A1* | 3/2006 | Chen | 375/229 |
| 2007/0136633 A1 | 6/2007 | Lee et al. | |
| 2007/0280368 A1* | 12/2007 | Jonsson | 375/262 |

FOREIGN PATENT DOCUMENTS

| | | |
|---|---|---|
| CN | 1832390 A | 9/2006 |
| CN | 1937479 A | 3/2007 |
| CN | 101034959 A | 9/2007 |

(Continued)

OTHER PUBLICATIONS

IEEE 802.16 Broadband Wireless Access Working Group, IEEE C802.16e-04/225, Hang Zhang et al., Jun. 25, 2004.

*Primary Examiner* — Joshua P Lottich
*Assistant Examiner* — Jeison C Arcos
(74) *Attorney, Agent, or Firm* — Jefferson IP Law, LLP

(57) ABSTRACT

An apparatus and method for reducing power consumption of a receiver by performing a Hybrid Automatic Repeat reQuest (HARQ) according to a detected decoding error are provided. The apparatus includes a decoding reliability metric generator for setting a decoding result as a decoding reliability metric, which is a reference value for determining a code block having a decoding error, based on a decoding result, a decoding reliability metric buffer for storing the decoding reliability metric set by the decoding reliability metric generator and a code block controller for, when the decoding error occurs, identifying code blocks having the decoding error by checking the decoding reliability metric and for controlling to decode the identified code blocks.

20 Claims, 8 Drawing Sheets

(56) References Cited

FOREIGN PATENT DOCUMENTS

| KR | 10-2003-0075183 A | 9/2003 |
| KR | 10-2005-0041344 A | 5/2005 |
| KR | 10-2007-0091883 A | 9/2007 |
| WO | 2007/078219 A1 | 7/2007 |

* cited by examiner

APPARATUS AND METHOD FOR DECODING IN MOBILE COMMUNICATION SYSTEM

PRIORITY

This application claims the benefit under 35 U.S.C. §119 (a) of a Korean patent application filed in the Korean Intellectual Property Office on Oct. 17, 2007 and assigned Serial No. 2007-104426, the entire disclosure of which is hereby incorporated by reference.

BACKGROUND OF THE INVENTION

1. Field of the Invention

The present invention relates to an apparatus and method for receiving a transmission in a mobile communication system. More particularly, the present invention relates to an apparatus and a method for reducing power consumption of a receiver by performing a Hybrid Automatic Repeat reQuest (HARQ) according to a detected decoding error.

2. Description of the Related Art

With advances in technology, mobile communication systems now include wireless data packet communication systems of high speed and high quality. Such communication systems provide data service and multimedia service, beyond the initial voice-oriented services. The development of High Speed Downlink Packet Access (HSDPA), which progressed as part of the $3^{rd}$ Generation Partnership Project (3GPP), can be viewed as a representative effort for providing a wireless data packet transport service having high quality at over 2 Mbps in the 3G mobile communication system.

In a data packet communication system, when a transport block to be coded exceeds a certain bit size, the mobile communication system performs a code block segmentation. The code block segmentation segments the transport block into a plurality of code blocks, each code block having a size smaller than the certain bit size.

FIG. 1 depicts a conventional channel coding process in a mobile communication system.

Referring to FIG. 1, a transport block 100 includes a Cyclic Redundancy Code (CRC) 110 for detecting an error in the transport block. The CRC 110 goes through the code block segmentation 120 along with the transport block 100. The code block segmentation 120 segments the single transport block 100, including the CRC 110, into a smaller size according to a preset rule and generates a plurality of code blocks.

The segmented code blocks pass through the channel coding 130 (e.g. turbo coding) independently. The coded code blocks are then reconstituted to produce one bit stream through a code block concatenation 140. Typically, the generated bit stream is transmitted using a rate matching (e.g. bitwise puncture or bitwise repetition) and a channel interleaving.

In the mobile communication system, if the transmission contains errors, the data is retransmitted. Typically, the retransmission is carried out using a Hybrid Automatic Repeat reQuest (HARQ) process. In the HARQ process, a receiver sends a Negative ACKnowledgment (NACK) signal to a transmitter in a backward channel when the received transport block 100 is corrupted. When the response of the receiver for the transmitted transport block 100 is the NACK, the HARQ transmitter performs the retransmission. The HARQ transmission differs from the general ARQ transmission in that its performance can be enhanced using a soft combination (e.g. chase combining or incremental redundancy) of the previously received coded values, which are stored in the receiver, and the currently received coded values in the coded code blocks.

FIG. 2 depicts a conventional HARQ process in a mobile communication system.

In the conventional HARQ process, the receiver decodes a signal received via a receive antenna, checks for error using the CRC and conducts the retransmission.

In more detail, the receiver segments one received transport block, including the CRC, into a plurality of code blocks having a size according to a preset rule.

Next, the receiver independently codes (e.g. turbo coding) the segmented code blocks and generates one bit stream using the code block concatenation on the coded code blocks. Typically, the generated bit stream is transmitted after passing through rating matching (e.g. bitwise puncture or bitwise repetition) and channel interleaving.

When the decoding error occurs, the receiver performs the retransmission using HARQ. In the HARQ process, the receiver decodes every code block in the retransmission. However, not all code blocks are subject to corruption. That is, the decoding is conducted unnecessarily on not only the corrupted code blocks but also the normally decoded code blocks that do not contain an error in their retransmission. As a result, the power consumption of the receiver is unnecessarily increased.

SUMMARY OF THE INVENTION

An aspect of the present invention is to address at least the above mentioned problems and/or disadvantages and to provide at least the advantages described below. Accordingly, an aspect of the present invention is to provide an apparatus and method for lowering power consumption of a mobile communication system.

Another aspect of the present invention is to provide an apparatus and method for reducing power consumption of the receiver by performing a Hybrid Automatic Repeat reQuest (HARQ) and then omitting the decoding on every code block in a mobile communication system.

Yet another aspect of the present invention is to provide an apparatus and method for conducting an HARQ and then decoding corrupted code blocks in a mobile communication system.

In the following, the term "reliability metric" (reliability hard-decision metric and reliability soft-decision metric) refers to a reference value for determining a code block having the decoding error.

In accordance with an aspect of the present invention, an apparatus for decoding to lower power consumption is provided. The apparatus includes a decoding reliability metric generator for setting a decoding result as a decoding reliability metric, which is a reference value for determining a code block having a decoding error, based on a decoding result, a decoding reliability metric buffer for storing the decoding reliability metric set by the decoding reliability metric generator, and a code block controller for, when the decoding error occurs, identifying code blocks having the decoding error by checking the decoding reliability metric and for controlling to decode the identified code blocks.

According to another aspect of the present invention, a method for decoding in a receiver is provided. The method includes setting a decoding result as a decoding reliability metric which is a reference value of determining a code block having a decoding error, when the decoding error occurs, identifying code blocks having the decoding error by checking the decoding reliability metric and decoding the identified code blocks by the code block.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for performing a Hybrid Automatic Repeat reQuest (HARQ) according to a detected decoding error in the process of the decoding and then decoding a corrupted code block without decoding every code block in a mobile communication system.

Figure 1:
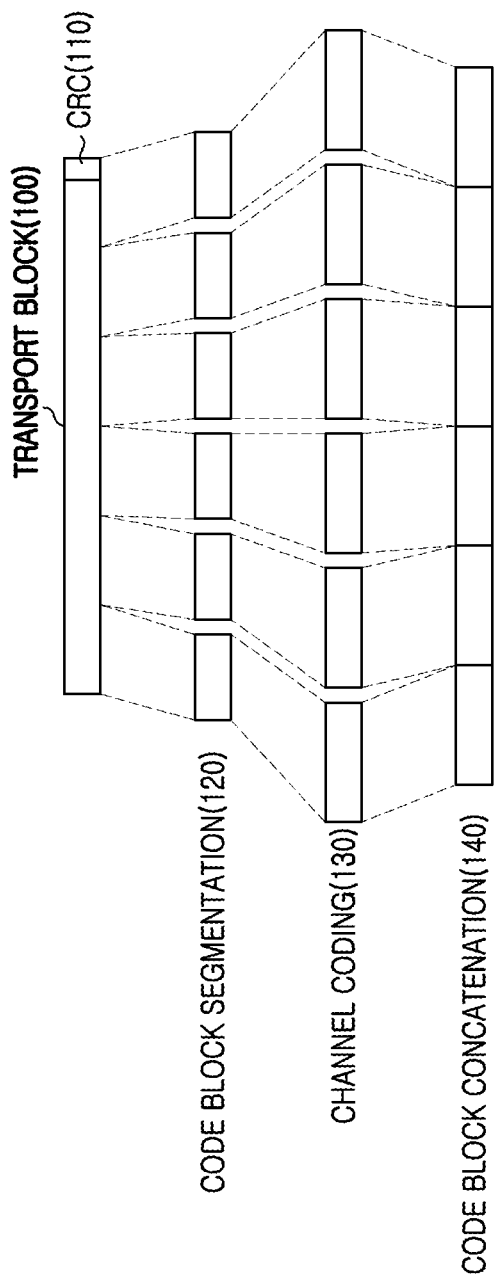
FIG. 1 illustrates a conventional channel coding process of a mobile communication system.
Figure 2:
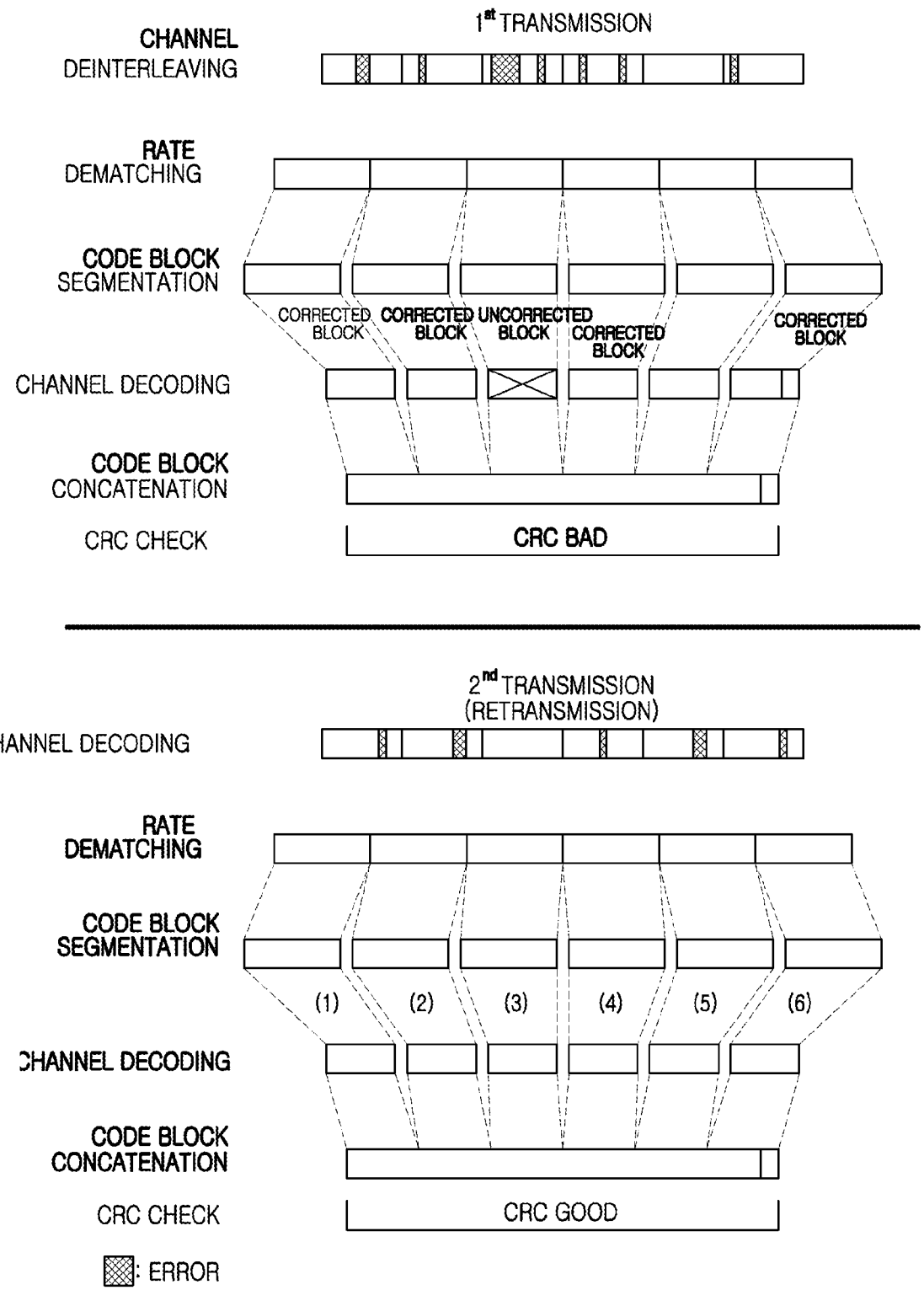
FIG. 2 illustrates a conventional HARQ process of a mobile communication system.
Figure 3:
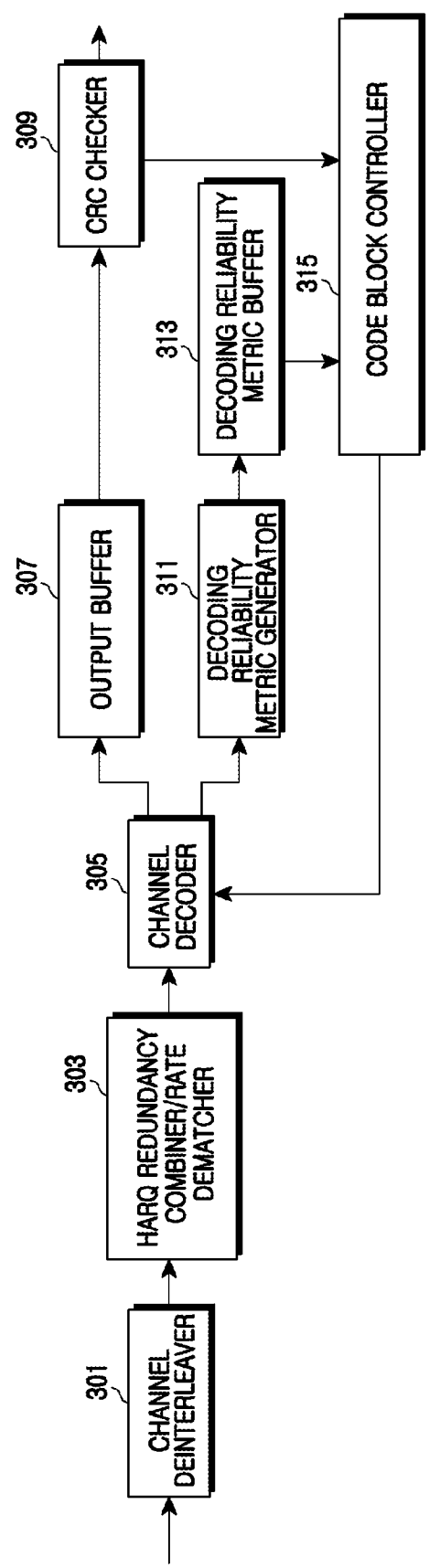
FIG. 3 illustrates a receiver according to an exemplary embodiment of the present invention.

FIG. 3 is a block diagram of a receiver according to an exemplary embodiment of the present invention.

Referring to FIG. 3, an exemplary receiver includes a channel deinterleaver 301, a HARQ redundancy combiner/rate dematcher 303, a channel decoder 305, an output buffer 307, a Cyclic Redundancy Code (CRC) checker 309, a decoding reliability metric generator 311, a decoding reliability metric buffer 313 and a code block controller 315.

The channel deinterleaver 301 disperses successive errors in a physical channel by restoring the channel-interleaved signal bit-by-bit in the physical channel. The HARQ redundancy combiner/rate dematcher 303 soft-combines the bit stream transmitted in the physical channel according to a transport rate corresponding to the retransmission.

The channel decoder 305 decodes the coded bit stream using the code blocks and outputs the decoded data. The output buffer 307 stores the decoded data. In an exemplary implementation, the channel decoder 305 may include a turbo decoder in a communication system such as High Speed Packet Access (HSPA), $3^{rd}$ Generation Partnership Project Long Term Evolution (3GPP LTE), and so on. The CRC checker 309 determines whether the reception is successful or not using the CRC from the decoding result of the entire transport block that was stored in the output buffer 307.

The decoding reliability metric generator 311 generates a decoding reliability metric that is used to determine the decoding error of the decoded code blocks using the operation result of the channel decoder 305. The decoding reliability metric buffer 313 stores the decoding reliability metric generated by the decoding reliability metric generator 311.

The code block controller 315 controls the channel decoder 305 by determining whether the channel decoding per code block is required in the HARQ retransmission using the decoding reliability metric that is pre-stored in the decoding reliability metric buffer 313.

Figure 4:
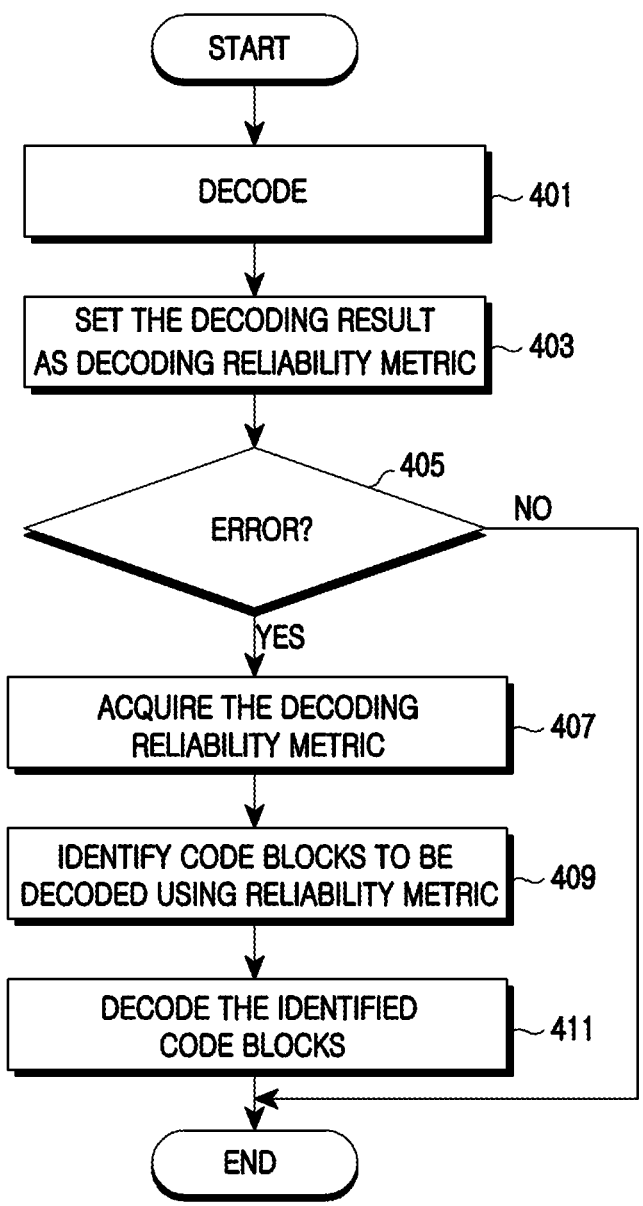
FIG. 4 illustrates a decoding method of a receiver according to an exemplary embodiment of the present invention.

FIG. 4 is a flowchart illustrating a decoding method of a receiver according to an exemplary embodiment of the present invention.

Referring to FIG. 4, the receiver decodes a signal received via the receive antenna in step 401 and sets the decoding result as the decoding reliability metric in step 403. Herein, the decoding result set as the decoding reliability metric includes both a hard-decision metric and a soft-decision metric. The setting of the decoding result will be described in more detail by referring to FIGS. 5-8.

In step 405, the receiver determines if a decoding error occurs. If the receiver determines that there is no decoding error, the receiver finishes this process.

In contrast, if the receiver determines that there is a decoding error, in step 407 the receiver acquires the decoding reliability metric set in step 403, after the retransmission through the HARQ. In step 409, the receiver identifies code blocks requiring decoding using the acquired decoding reliability metric.

In step 411, the receiver re-decodes only the code blocks that require the decoding.

Next, the receiver finishes the process.

Figure 5:
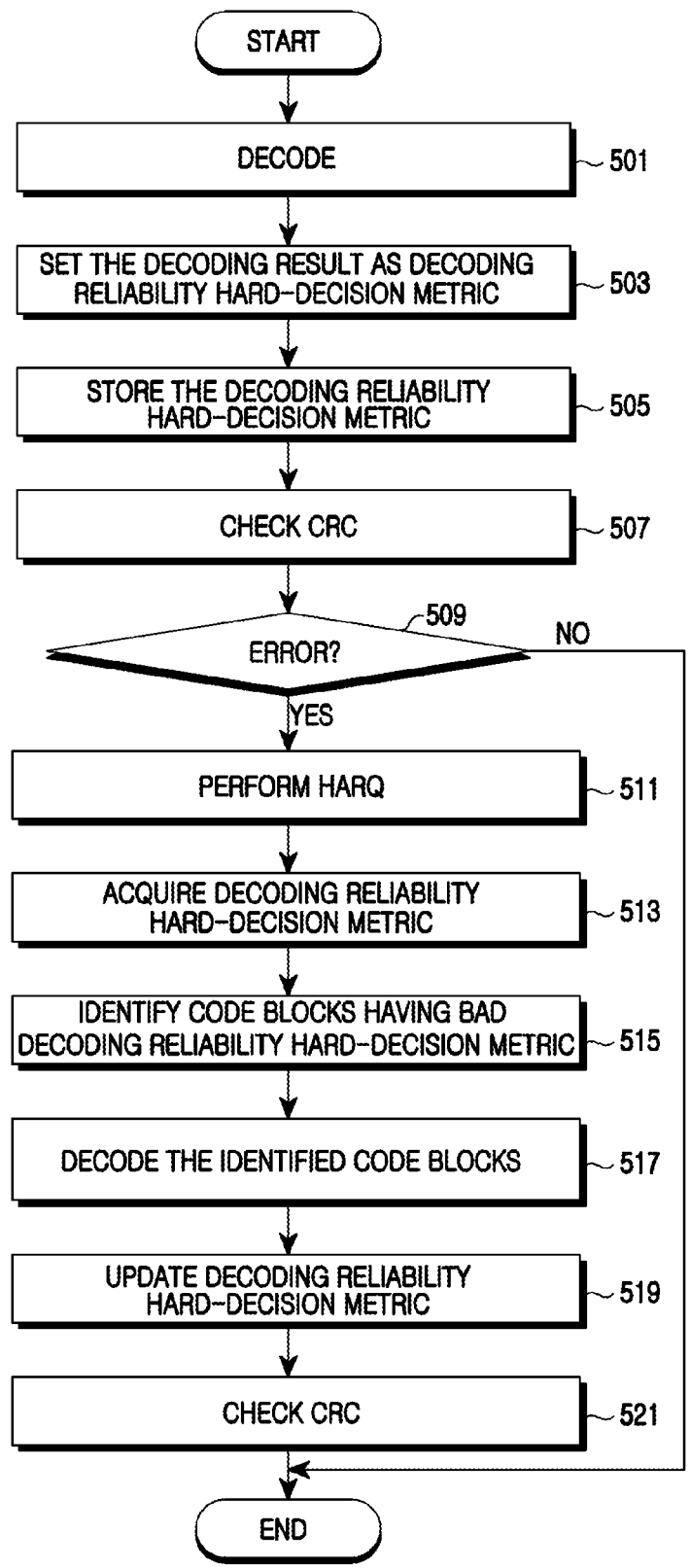
FIG. 5 illustrates a decoding method of a receiver according to an exemplary embodiment of the present invention.
Figure 6:
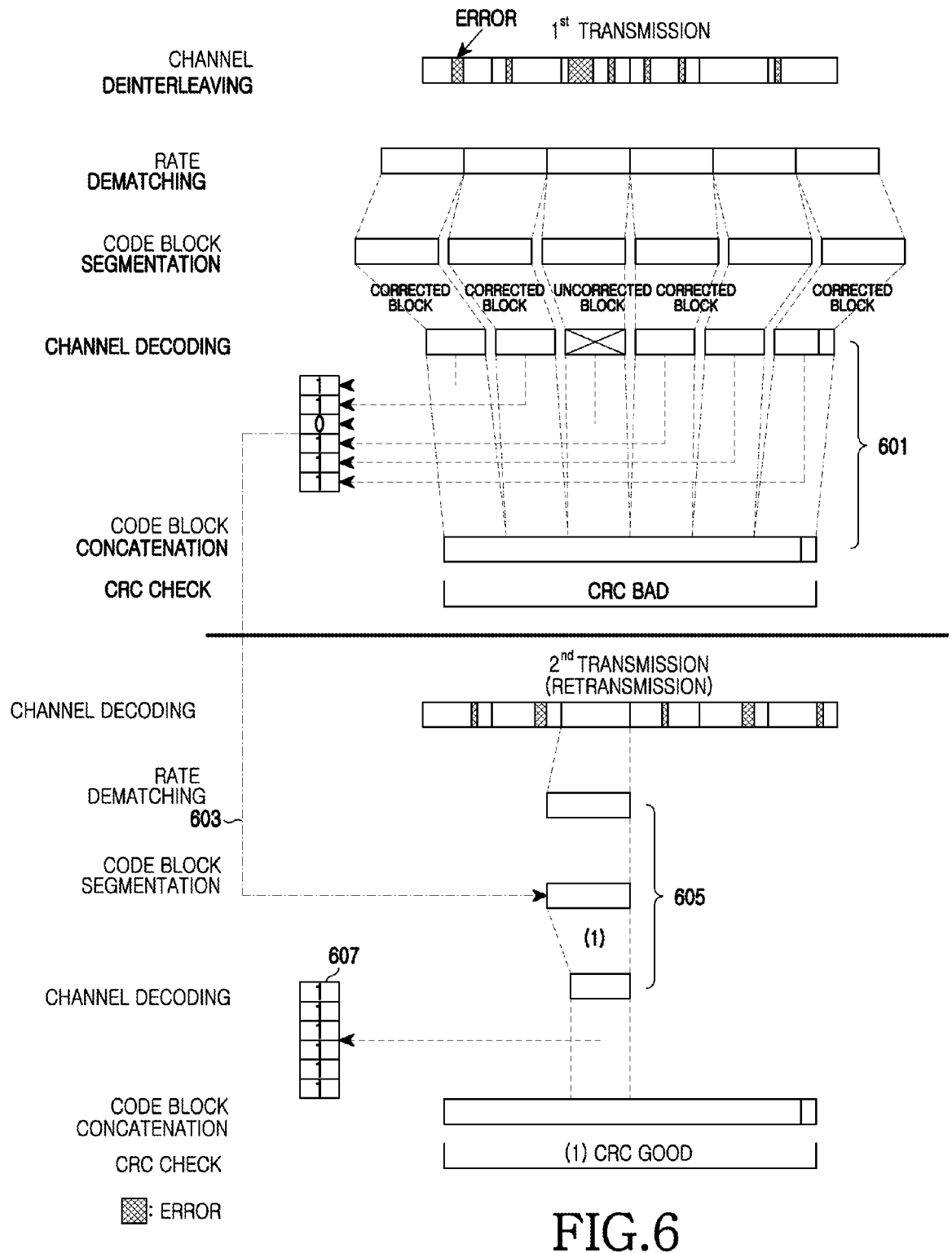
FIG. 6 illustrates a decoding method of a receiver according to an exemplary embodiment of the present invention.

FIG. 5 is a flowchart illustrating a decoding method of a receiver according to an exemplary embodiment of the present invention. FIG. 6 depicts the decoding method of the receiver illustrated in FIG. 5.

Referring to FIG. 5, the receiver decodes a signal received over the receive antenna in step 501 and sets the decoding result as a decoding reliability hard-decision metric in step 503. As illustrated in FIG. 6, when an average of actual Log Likelihood Ratios (LLRs) of the decoding result is greater than a threshold, the decoding reliability hard-decision metric is set to a value of '1' which is indicative of a positive hard-decision metric. When the average value of the actual LLRs is less than the threshold, the decoding reliability hard-decision metric is set to a value of '0' which is indicative of a negative hard-decision metric in step 601.

In step 505 the receiver stores the decoding reliability hard-decision metric, which was set in step 503, to the decoding reliability metric buffer and conducts the CRC check in step 507. In step 509, the receiver determines whether a reception error occurs according to the CRC.

If it is determined that there is no reception error in step 509, the receiver finishes this process.

On the contrary, if it is determined that a reception error occurs in step 509, the receiver performs the HARQ in step 511 and acquires the decoding reliability hard-decision metric, previously stored in step 505, in step 513 (step 603 in FIG. 6). Herein, the receiver can identify the code blocks to be decoded using the acquired reliability hard-decision metric.

In step 515, the receiver identifies code blocks to be decoded using the acquired reliability hard-decision metric. For example, the receiver can determine not to decode a code block having a decoding reliability hard-decision metric of '1', but to decode a code block having a decoding reliability hard-decision metric of '0' as illustrated in FIG. 6.

The receiver decodes the identified code blocks in step 517 (step 605 in FIG. 6) and updates the decoding reliability hard-decision metric of the decoded code blocks to '1' in step 519 (step 607 in FIG. 6).

In step 521, the receiver determines whether the reception of the corresponding retransmission is successful using the CRC.

Next, the receiver finishes this process.

Figure 7:
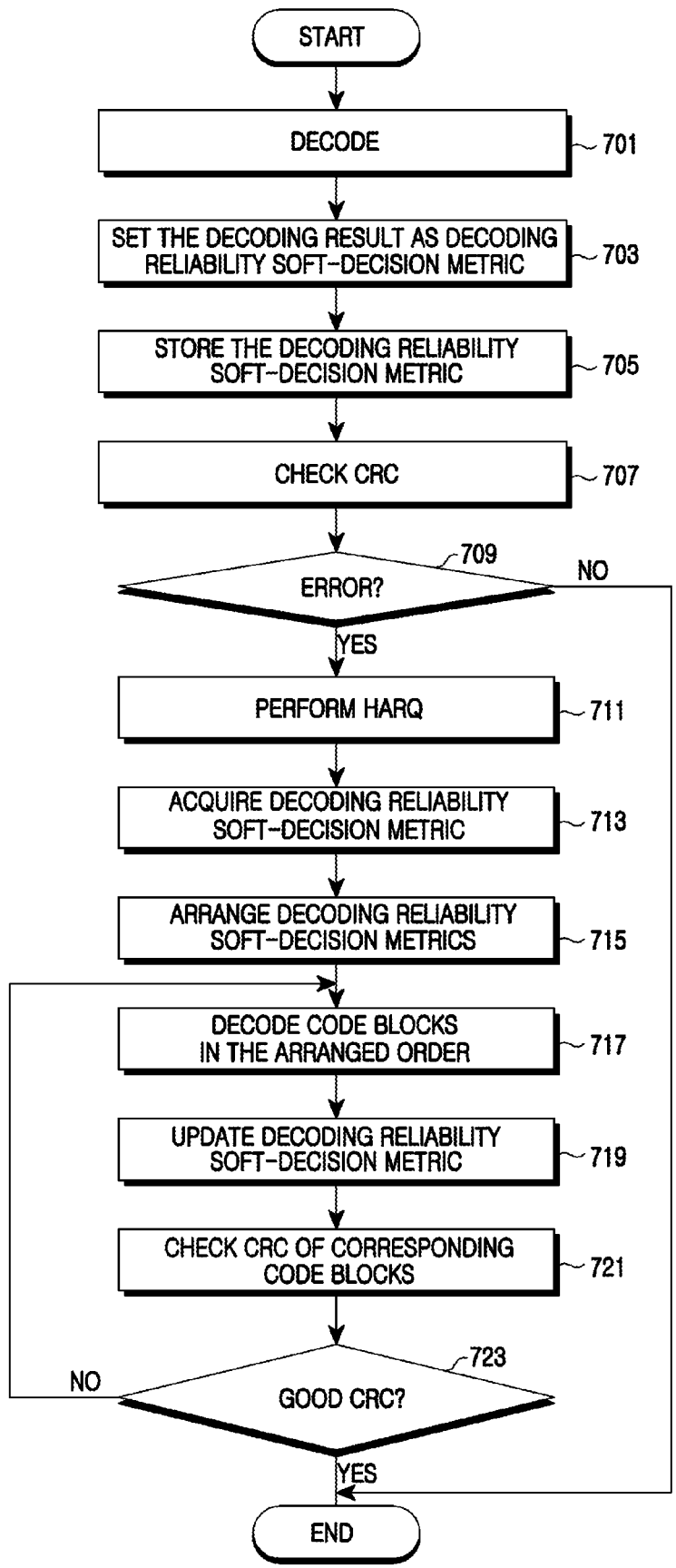
FIG. 7 illustrates a decoding method of a receiver according to an exemplary embodiment of the present invention.
Figure 8:
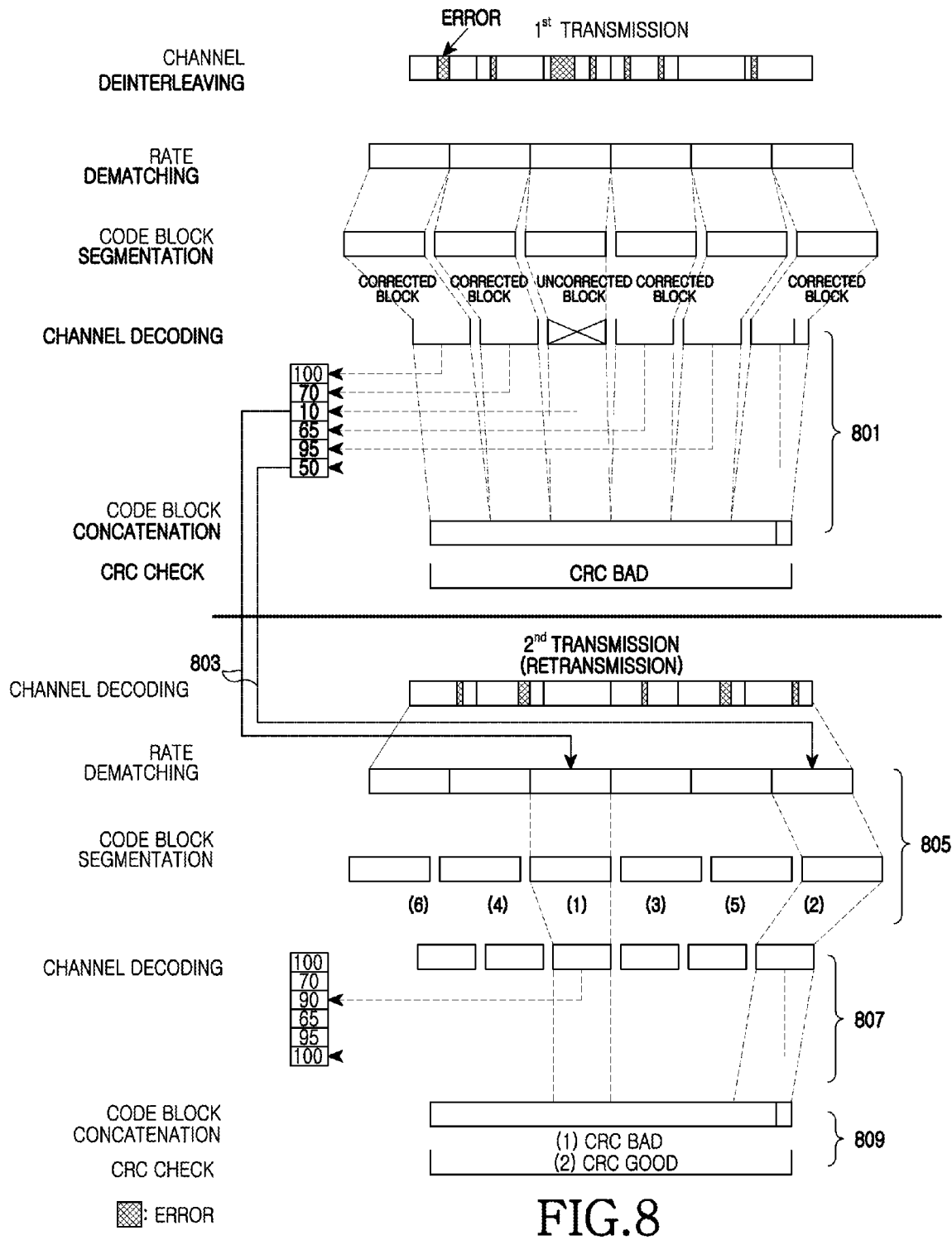
FIG. 8 illustrates a decoding method of a receiver according to an exemplary embodiment of the present invention.

FIG. 7 is a flowchart illustrating a decoding method of a receiver according to an exemplary embodiment of the present invention. FIG. 8 depicts the decoding method illustrated in FIG. 7.

Referring to FIG. 7, the receiver decodes a signal received over a receive antenna in step 701, and sets the decoding result as a decoding reliability soft-decision metric in step 703. As illustrated in FIG. 8, the receiver can set an average value of the actual LLRs according to the decoding result as the decoding reliability soft-decision metric in step 801.

In step 705, the receiver stores the decoding reliability soft-decision metric, which was set in step 703, in the decoding reliability metric buffer and conducts the CRC check in step 707. In step 709, the receiver determines whether a reception error occurs using the CRC.

If it is determined that there is no reception error in step 709, the receiver finishes this process.

On the contrary, if it is determined that there is a reception error in step 709, the receiver performs the HARQ in step 711 and acquires the decoding reliability soft-decision metric, which was stored in step 705, in step 713 (step 803 in FIG. 8). Herein, the receiver can identify code blocks to be decoded using the acquired reliability soft-decision metric.

In step 715, the receiver arranges the acquired decoding reliability soft-decision metric. In an exemplary implementation, the receiver may arrange the values of the acquired decoding reliability soft-decision metric in descending order from best to worst value.

The receiver decodes the code blocks in the arranged order in step 717 (step 805 in FIG. 8) and updates the decoding reliability soft-decision metric in step 719. In further detail, the receiver updates the decoding reliability soft-decision metric of the decoded code blocks in step 807 of FIG. 8.

The receiver conducts the CRC check on the corresponding decoded code blocks in step 721 and evaluates the CRC result in step 723 (step 809 of FIG. 8).

When the CRC check result is negative, the receiver returns to step 717 and decodes the code blocks arranged in the next order of the currently decoded code blocks.

In contrast, when the CRC result is positive, the receiver finishes this process without further decoding. As such, because the method of FIG. 7, unlike the method of FIG. 5, performs the CRC in every decoding operation of the code blocks, it can further improve on the method of FIG. 5 by decoding the corrupted code blocks.

As set forth above, an exemplary receiver of the mobile communication system controls to identify the code blocks of the decoding error and to re-decode only the identified code blocks in the HARQ based on the detection of the decoding error. Therefore, exemplary embodiments of the present invention can improve the power consumption of the receiver in comparison to the conventional mobile communication system which unnecessarily decodes not only the corrupted code blocks but also the normally decoded code blocks in the retransmission.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for decoding a received signal, the apparatus comprising:
    a decoding reliability metric generator for setting a decoding reliability metric, which is a reference value for determining one or more decoding errored code blocks from a transport block comprising a plurality of code blocks, based on a decoding result;
    a decoding reliability metric buffer for storing the decoding reliability metric set by the decoding reliability metric generator; and
    a code block controller for, when the decoding error occurs, receiving a transport block retransmitted according to a retransmission request and identifying at least one decoding errored code block in the received transport block based on the decoding reliability metric, and for controlling to re-decode only the identified at least one decoding errored code blocks among the plurality of code blocks included in the received transport block.

2. The apparatus of claim 1, wherein the decoding reliability metric generator updates the decoding reliability metric when decoding the identified at least one decoding errored code blocks.

3. The apparatus of claim 2, wherein the decoding reliability metric comprises at least one of a decoding reliability hard-decision metric and a decoding reliability soft-decision metric.

4. The apparatus of claim 3, wherein the code block controller identifies the decoding errored code blocks using the at least one of the decoding reliability hard-decision metric and the decoding reliability soft-decision metric.

5. The apparatus of claim 4, wherein, when the decoding error occurs, the code block controller determines a code block having a negative decoding reliability hard-decision metric as the decoding errored code blocks.

6. The apparatus of claim 5, wherein a Cyclic Redundancy Code (CRC) check is performed after the decoding errored code blocks are decoded by the code block controller.

7. The apparatus of claim 4, wherein the code block controller arranges the decoding reliability metrics in order when the decoding error occurs and decodes code blocks corresponding to the arranged order.

8. The apparatus of claim 7, wherein a CRC check is conducted in every decoding operation of the code blocks.

9. A method for decoding a received signal, the method comprising:
    setting a decoding result as a decoding reliability metric which is a reference value for determining one or more decoding errored code blocks from a transport block comprising a plurality of code blocks;
    when the decoding error occurs, receiving a transport block retransmitted according to a retransmission request and identifying at least one decoding errored code blocks in the received transport block based on the decoding reliability metric; and re-decoding only the identified at least one decoding errored code blocks among the plurality of code blocks included in the received transport block.

10. The method of claim 9, further comprising:

updating the decoding reliability metric after the decoding of the identified at least one decoding errored code blocks.

11. The method of claim 10, wherein the decoding reliability metric comprises at least one of a decoding reliability hard-decision metric and a decoding reliability soft-decision metric.

12. The method of claim 11, wherein the identifying of the at least one decoding errored code blocks comprises using the at least one of the decoding reliability hard-decision metric and the decoding reliability soft-decision metric.

13. The method of claim 12, wherein the identifying of the at least one decoding errored code blocks using the decoding reliability hard-decision metric comprises:

setting a decoding result as the decoding reliability hard-decision metric; and identifying code blocks having a negative decoding reliability hard-decision metric by checking the decoding reliability hard-decision metric when the decoding error occurs.

14. The method of claim 13, wherein the identifying of the at least one decoding errored code blocks using the decoding reliability hard-decision metric further comprises:

conducting a Cyclic Redundancy Code (CRC) check after the decoding of the code blocks having the negative decoding reliability hard-decision metric.

15. The method of claim 12, wherein the identifying of the at least one decoding errored code blocks using the decoding reliability soft-decision metric comprises:

setting a decoding result as the decoding reliability soft-decision metric;

arranging the decoding reliability metrics in order by checking the decoding reliability soft-decision metric when the decoding error occurs; and decoding code blocks corresponding to the arranged order.

16. The method of claim 15, wherein the identifying of the at least one decoding errored code blocks using the decoding reliability soft-decision metric further comprises:

conducting a CRC check on the decoded code blocks after the decoding.

17. A method for decoding a received signal, the method comprising:

receiving a signal including a plurality of code blocks;

decoding the received signal including the plurality of code blocks;

setting the decoding result as a decoding reliability metric and storing the decoding reliability metric;

determining if a decoding error occurs in the receiving of the signal;

when the decoding error in the receiving of the signal occurs, requesting retransmission of the signal and identifying at least one decoding errored code block in the received signal according to a retransmission request by evaluating the decoding reliability metric; and decoding only the identified at least one decoding errored code block among the plurality of code bocks included in the signal.

18. The apparatus of claim 1, wherein the decoding of the received signal comprises checking a Cyclic Redundancy Code (CRC) indicating a presence of the decoding error.

19. The method of claim 9, further comprising checking a Cyclic Redundancy Code (CRC) indicating a presence of the decoding error.

20. The method of claim 17, wherein the decoding of the received signal comprises checking a Cyclic Redundancy Code (CRC) indicating a presence of the decoding error.

* * * * *